(12) United States Patent
Yelovitch et al.

(10) Patent No.: US 11,138,682 B2
(45) Date of Patent: Oct. 5, 2021

(54) REAL-TIME MONITORING

(71) Applicant: Hippo Analytics, Mountain View, CA (US)

(72) Inventors: Arie Yelovitch, Santa Clara, CA (US); Eyal Navon, Sunnyvale, CA (US); Ran Israel Halprin Limor, Sunnyvale, CA (US)

(73) Assignee: Hippo Analytics Inc., Palo Alto, CA (US)

( * ) Notice: Subject to any disclaimer, the term of this patent is extended or adjusted under 35 U.S.C. 154(b) by 69 days.

(21) Appl. No.: 16/295,919

(22) Filed: Mar. 7, 2019

(65) Prior Publication Data

US 2019/0362448 A1   Nov. 28, 2019

Related U.S. Application Data

(63) Continuation-in-part of application No. 15/987,601, filed on May 23, 2018.

(51) Int. Cl.
*G06Q 50/16* (2012.01)
*G06Q 40/02* (2012.01)
*G06Q 40/08* (2012.01)

(52) U.S. Cl.
CPC .......... *G06Q 50/16* (2013.01); *G06Q 40/025* (2013.01); *G06Q 40/08* (2013.01)

(58) Field of Classification Search
CPC ........ G06Q 40/08; G06Q 10/10; G06Q 50/16; G06Q 40/025
See application file for complete search history.

(56) References Cited

U.S. PATENT DOCUMENTS

| | | | | |
|---|---|---|---|---|
| 4,831,526 A | * | 5/1989 | Luchs ................. | G06Q 40/02 705/4 |
| 5,655,085 A | * | 8/1997 | Ryan .................. | G06Q 40/02 705/4 |
| 8,433,588 B2 | * | 4/2013 | Willis ................. | G06Q 40/08 705/4 |

(Continued)

OTHER PUBLICATIONS

"U.S. Appl. No. 15/987,601, Final Office Action dated Oct. 23, 2020", 51 pgs.

(Continued)

*Primary Examiner* — Scott C Anderson
*Assistant Examiner* — Marla Hudson
(74) *Attorney, Agent, or Firm* — Schwegman Lundberg & Woessner, P.A.

(57) ABSTRACT

A technique for accessing multiple rate data from several sources and applying the rate data to pre-populated data of a survey is described. The techniques include backend processes and architectures that allow for the retrieval, modeling, and population of certain data fields during the customer evaluation process as during the process of requesting a quote for products or services. The process includes accessing static property information of a property from a first plurality of sources, computing a rate for the property based on the static property information, accessing dynamic property information of the property from a second plurality of sources, adjusting the rate for the property based on the dynamic property information, and generating a rate graphical user interface that indicates the adjusted rate for the property.

20 Claims, 17 Drawing Sheets

(56) References Cited

U.S. PATENT DOCUMENTS

| | | | |
|---|---|---|---|
| 2018/0047106 A1* | 2/2018 | Snyder | G06Q 40/08 |
| 2019/0303982 A1* | 10/2019 | Michel | G05D 1/042 |
| 2019/0362428 A1 | 11/2019 | Yelovitch et al. | |
| 2020/0104941 A1* | 4/2020 | Lekas | G06Q 40/08 |

OTHER PUBLICATIONS

"U.S. Appl. No. 15/987,601, Non Final Office Action dated Jun. 22, 2020", 45 pgs.

"U.S. Appl. No. 15/987,601, Response filed Sep. 22, 2020 to Non Final Office Action dated Jun. 22, 2020", 11 pgs.

* cited by examiner

FIG. 11B

OK. NOW JUST TELL US ABOUT YOUR HOME'S FIXTURES & FINISHES

THIS ALLOWS US TO ESTIMATE REBUILDING COST IN THE EVENT OF DAMAGE.

JUST THE BASICS
EXAMPLE: MEDIUM GRADE FLOORING, CARPETING, OR CABINETS, AND OTHER COMMON DETAILS.
50% CHOOSE THIS

A FEW EXTRAS
EXAMPLE: HIGH GRADE SIDING OR ROOFING, BUILT-IN BOOKSHELVES, BAY WINDOWS, MARBLE/GRANITE COUNTERS, ABOVE AVERAGE APPLIANCES
45% CHOOSE THIS

TOP OF THE LINE
EXAMPLE: MARBLE FLOORING, CRYSTAL CHANDELIERS, COMMERCIAL OR BUILT-IN APPLIANCES, ORNATE FINISHES
5% CHOOSE THIS

HOW ARE THESE DIFFERENT?

*FIG. 11D*

VOILÀ! HERE ARE THREE GREAT OPTIONS FOR YOU.
YOU CAN ALWAYS MODIFY YOUR PLAN LATER

THE ESSENTIALS
35% CHOOSE THIS
$167 /MO
SELECT $535,000
25% ERC ⓘ

$200,000

$267,500
ACTUAL CASH VALUE ⓘ

OUR BEST VALUE
50% CHOOSE THIS
$201 /MO
SELECT
✎ CUSTOMIZE

COVERAGE FOR HOME
$535,000
+25% EXTENDED
REPLACEMENT COST

LIABILITY
$300,000

PERSONAL PROPERTY
$374,500
REPLACEMENT COST ⓘ

EXPANDED PROTECTION
10% CHOOSE THIS
$233 /MO
SELECT $535,000
50% ERC ⓘ

$500,000

$374,500
REPLACEMENT COST ⓘ

*FIG. 11F*

REAL-TIME MONITORING

RELATED APPLICATION

The present application is a continuation-in-part of application Ser. No. 15/987,601, entitled "DYNAMIC FUNNELING OF CUSTOMERS TO DIFFERENT RATE PLANS" filed May 23, 2018.

TECHNICAL FIELD

The subject matter disclosed herein generally relates to an electronic communications platform that facilitates online insurance and loan applications and, in particular, to an electronic communications platform that computes real-time rates across multiple data sources from online information sources.

BACKGROUND

The process of obtaining insurance on property or collateralizing a loan requires a loan agent to collect information from a potential customer about the customer and, in the case of insurance or a loan on property such as a home, information about the home. Whether the insurance or loan application is submitted online or in person, the process requires the potential customer to provide the personal information and the property information in an application that is then used to obtain a quote. Typically, the customer must provide to the agent 20-30 items of information about the property alone, in addition to the information about the customer. For example, in the case of insurance on a home, the customer is asked to provide the address of the home, the roof and wall materials, when the roof was last replaced, square footage, when the home was built, and the like. Once the application has been completed, the insurance or loan company must validate the information, which may require one or more follow-up conversations with the potential customer to collect missing information and to correct erroneous information. In many cases, the information relating to the property to be insured is unknown to the potential customer and must be looked up through the appropriate information sources. Generally, whether this process is performed in person, on paper, or online, the back and forth with the agent required to obtain the requisite information and then obtain a quote may take several days or even weeks. The agent would then need to use standard information sources to supplement the provided information with other information (e.g., distance to the nearest fire station), to validate the provided information, to obtain policy information, and then to generate a quote for the insurance policy or loan to be offered. The policy or loan is then reviewed and offered to the customer.

Since a quote is only as reliable as the information upon which it is based, one may not simply feed information into a computer and obtain a reliable quote. On the contrary, there are several technical hurdles to speeding up such a process. For example, the customer information must be captured and validated very quickly even for information that is not readily known by the potential customer. Also, in order to be reliable, the quote must be based on consistent information. This is difficult as the information used for insurance and loan quotes is often not available in a standardized format. Also, while it is desirable to compare information from different information sources to confirm facts and figures, information from different information sources often conflicts, creating further difficulties. For these and other reasons, the process of automating the process of obtaining insurance and loan quotes quickly and accurately has proven to be very difficult.

BRIEF DESCRIPTION OF THE DRAWINGS

Some embodiments are illustrated by way of example and not limitation in the figures of the accompanying drawings of which:

FIG. 11B illustrates a graphical user interface for selecting the type of home once the address has been provided, in an example embodiment.

FIG. 11D illustrates a graphical user interface for entering information from the potential customer about the home's furnishings.

FIG. 11F illustrates a graphical user interface for presenting sample quotes to the potential customer based on the customer information and pre-filled property information, in an example embodiment.

DETAILED DESCRIPTION

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

To generate a comparison of normalized data from rate plans, a user of a computing device would typically fill out information and submit a request to each plan source. Furthermore, each plan source may request different types of information. The present disclosure addresses a system that retrieves the different rate plan, normalizes the different rate plans and computes a quote based on pre-filled information retrieved from third party sources. For example, information is gathered from the potential customer that can be used to obtain information related to that customer and property from publicly available information sources, privately available sources (e.g., network-connected sensors at the property), and data vendors to pre-fill the customer survey. However, the information available about customers and property is not in a standard format amongst information sources and thus cannot be readily compared for validation and conflict resolution. The information gathered from the information sources needs to be standardized for validation and comparison to resolve any conflicts among the gathered information. Furthermore, the information may be outdated or not up to date. Also, to improve the customer experience, this process needs to be completed in real-time or near real-time.

As a result, one or more of the methodologies described herein facilitate solving the technical problem of providing a unified graphical user interface that provides computes quotes based on property information and provides a plan comparison. As such, one or more of the methodologies described herein may obviate a need for certain efforts or computing resources that otherwise would be involved in computing quotes based on outdated information. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

Figure 1:
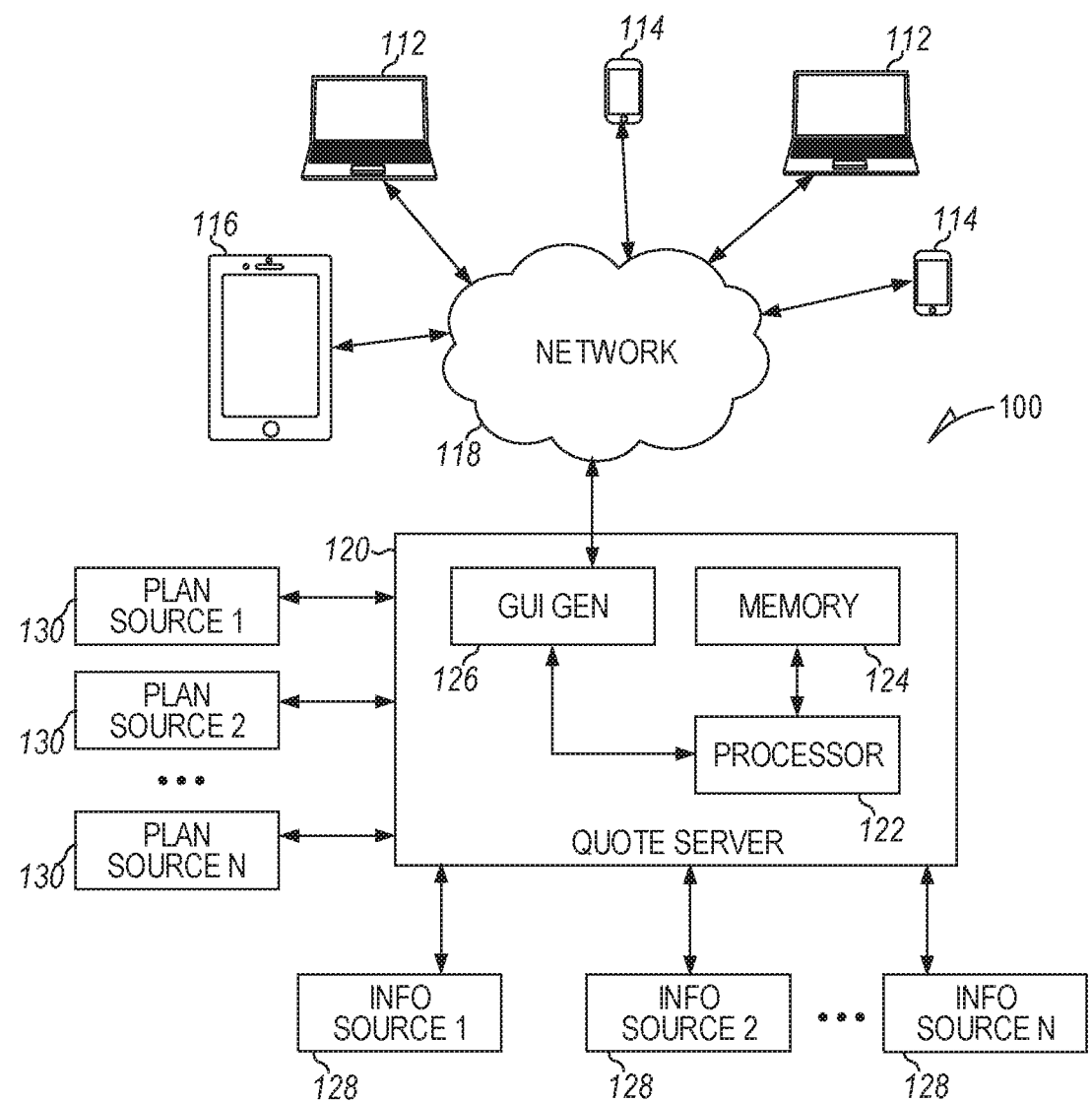
FIG. 1 illustrates the architecture of an electronic communications platform that pre-fills property and personal information into insurance and loan applications, in an example embodiment.

FIG. 1 illustrates the architecture of an electronic communications platform 100 that pre-fills property and personal information into loan applications and generates quotes based on the pre-filled information, in accordance with an example embodiment. As illustrated in FIG. 1, the electronic communications platform 100 is set up in a client server arrangement where potential customers communicate via their client devices and network 118 with a quote server 120. The client device may comprise, but is not limited to, a mobile phone 114, a desktop computer 112, or other communication device 116 including, for example, a laptop, portable digital assistant (PDA), smart phone, tablet, ultrabook, netbook, multi-processor system, microprocessor-based or programmable consumer electronic, or any other communication device that a user may utilize to access the quote server 120. In some embodiments, the client device 112, 114, 116 may comprise a display module (not shown) to display information (e.g., in the form of user interfaces). In further embodiments, the client device 112, 114, 116 may comprise one or more of touch screens, accelerometers, gyroscopes, cameras, microphones, global positioning system (GPS) devices, and so forth. The network 118 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a Wi-Fi network, a WiMAX network, another type of network, or a combination of two or more such networks. Also, the user of the client device 112, 114, 116 may be a person, a machine, or other means of interacting with the client device 112, 114, 116. In various embodiments, the user is not part of the communications platform 100, but is a potential customer that is interacting with the communications platform 100 via the client device 112, 114, 116 or another means.

The client device 112, 114, 116 may include one or more applications (also referred to as "apps") such as, but not limited to, a web browser, messaging application, electronic mail (email) application, an online access client, and the like. In some embodiments, if an online access client is included in the client device 112, 114, 116, then this application is configured to locally provide the user interface and at least some of the functionalities with the application configured to communicate with the communications platform 100, on an as needed basis, for data and/or processing capabilities not locally available. Conversely if the online access client is not included in the client device 112, 114, 116, the client device 112, 114, 116 may use its web browser to access the initialization and/or search functionalities of the communications platform 100.

An example operation includes the user providing input (e.g., touch screen input or alphanumeric input) to the client device 112, 114, 116 and the input is communicated to the client-server-based communications platform 100 via the network 118. In this instance, the communications platform 100, in response to receiving the input from the user, communicates information to the client device 112, 114, 116 via the network 118 to be presented to the user. In this way, the user can interact with the communications platform 100 using the client device 112, 114, 116. Further, while the communications platform 100 shown in FIG. 1 employs a client-server architecture, the present subject matter is of course not limited to such an architecture, and could equally well find application in a distributed, or peer-to-peer, architecture system, for example.

As illustrated in FIG. 1, the quote server 120 includes one or more processors 122 for executing instructions provided by instruction memory 124 for implementing the processes described herein. The quote server 120 also includes a graphical user interface (GUI) generator 126 controlled by processor(s) 122 to generate GUIs of the type illustrated in FIG. 1, for example, for sending data over the network 118 to the customer communication devices 112, 114, 116. As explained in more detail below, the processor(s) 122 implement processes for obtaining pre-fill information from information sources 128, and for computing rates based on data tables from plan sources 130.

Figure 2:
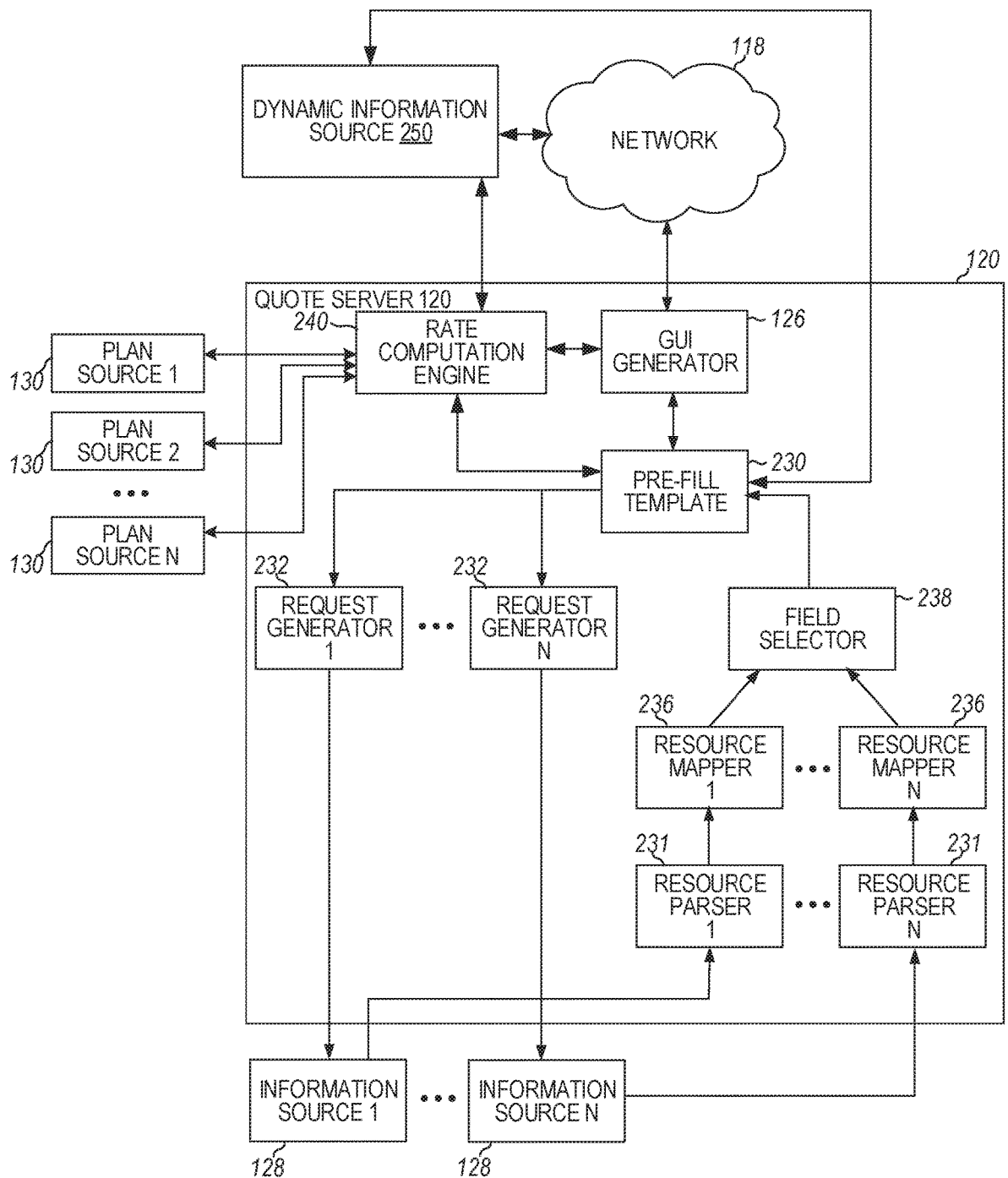
FIG. 2 illustrates a sample architecture for software processes of the quote server of the communications platform of FIG. 1, in an example embodiment.

FIG. 2 illustrates an example architecture for software processes of the quote server 120 of the communications platform 100 of FIG. 1, in an example embodiment. As illustrated, the processor(s) 122 process instructions from instruction memory 124 to implement software processes including graphical user interface (GUI) generator 126, a rate computation engine 240, pre-fill template 230, a request generator 232 for each information source 128, a response parser 231 for each information source 128, response mapper 236 for each information source 128, and field selector 238. As explained below, software processes work together to acquire person and property information from a parallel pool of available information sources 128 for automatically populating the fields of pre-fill template 230 for presentation to the potential customer via a GUI generated by GUI generator 126. For the example of obtaining property information for completion of a home insurance quote, the information sources 128 may include real estate listings and satellite imagery sources for checking information, as well as conventional financial and governmental information sources 128. Multiple information sources 128 for the same kind of information are provided for accuracy and coverage. As noted above, pre-filling the template 230 from online information sources 128 reduces human error, improves data consistency, and increases the speed of completing the customer survey as the need for human lookup of information is significantly reduced.

Furthermore, the rate computation engine 240 accesses multidimensional rate plan tables from plan sources 130 to compute a rate plan each plan source 130 based on the pre-filled data generated by the pre-fill template 230.

Figure 3:
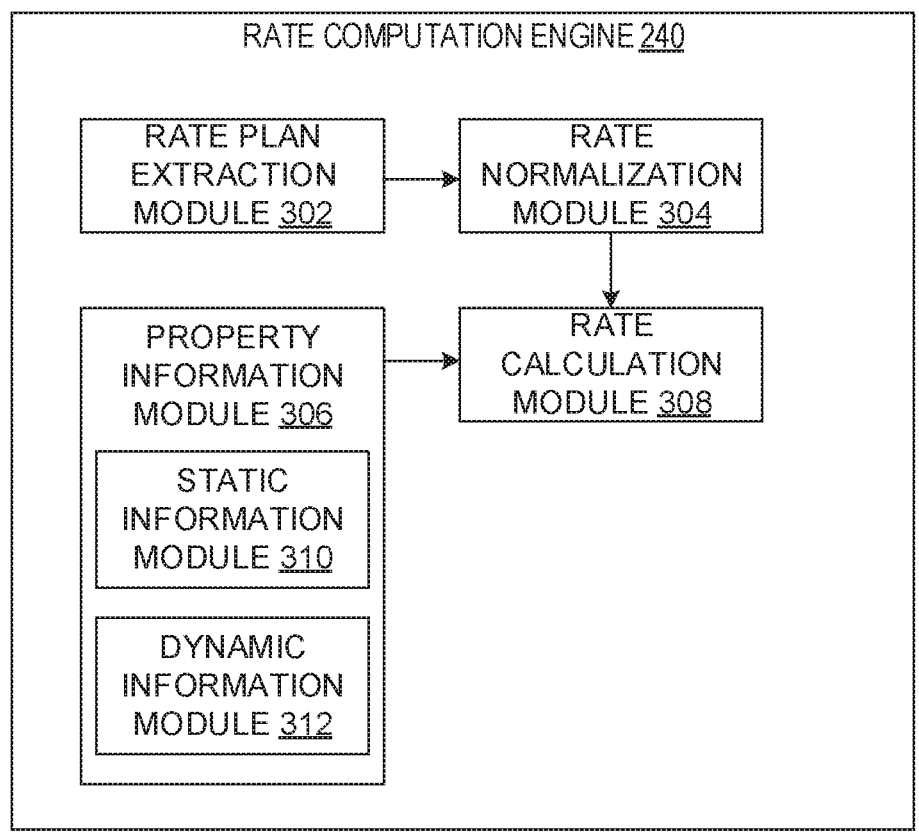
FIG. 3 illustrates a sample architecture for a rate computation engine of the quote server of the communications platform of FIG. 1, in an example embodiment.

FIG. 3 illustrates a sample architecture for the rate computation engine 240 of the quote server 120 of the communications platform 100 of FIG. 1, in an example embodiment. The rate computation engine 240 includes a rate plan extraction module 302, a rate normalization module 304, a rate calculation module 308, and a property information module 306. The rate plan extraction module 302 retrieves multi-dimensional data tables from plan sources 130. For example, each plan source 130 corresponds to an insurance provider. For each insurance provider, the plan source 130 may include several multi-dimensional tables with variables and rates. For example, one table may use zip code and property age as variables, while another table uses both the zip code and the proximity to a fire hydrant. The rate plan extraction module 302 retrieves the multiple data plan tables for each insurance provider. Therefore, the rate plan extraction module 302 obtains different rate plans (from different insurance providers) based on geographic location (e.g., state or zip code), and the type of dwelling (e.g., condominium, single family home).

The rate normalization module 304 normalizes the multiple data plan tables from the multiple plan sources 130 to identify tables with the same or similar variables. For example, the rate normalization module 304 generates a normalized table based on common variables. For example, if table 1 of a plan source 130 includes variables A, B and table 2 includes variables B, C, and table 3 of a plan source 130 Y includes variables A, C, the rate normalization module 304 generates a normalized table based on variables A and C.

The property information module 306 accesses and retrieves property information from several sources (e.g., public information database, and private information provided by network-enabled devices at a subject property). For example, the property information module 306 includes a static information module 310 and a dynamic information module 312. The static information module 310 accesses static information from databases related to the property. Static information may be considered information that has not changed or updated over a set period of time. For example, the address of a property is unlikely or does not change over a period of time (e.g., 5 years). Other examples include, the lot size of the property, the total square footage, the roof composition, the number of bedrooms. However, it is noted that over a longer period of time (e.g., 10 years), some static information may become dynamic information. For example, over a longer period of time (e.g., 20 years), the roof composition or the number of bedrooms may change as a results of a remodel or reconstruction.

In another example embodiment, the dynamic information module 312 accesses dynamic information databases related to the property. Dynamic information may be considered information that is often updated over a set period of time (e.g., 24 hours). For example, dynamic information may include sensor data from network-connected devices placed at the property. Examples of internet-enabled devices include network-connected thermostat, network-connected smoke sensor, network-connected motion sensor, and network-connected water sensor among others. The dynamic information from the internet-enabled devices can be used to determine or assess risk associated with the property. For example, data related to when the owner of the property activates/deactivates an alarm, pattern of activation/deactivation can be used to determine whether to adjust a rate for the property (e.g., applying a rate variation such as a discount). In another example, data from the internet-enabled devices at the property may indicate that the property is or has been vacant for a period of time exceeding a threshold (e.g., 90 days). The vacant condition may be factored in the calculation of the rate or the rate can be adjusted based on the vacant condition. Therefore, risk associated with the property can be evaluated on a real-time or near real-time basis based on the sensor data from the internet-enabled devices located at the property. It is noted that the dynamic information module, 312 may be granted access permission to the sensor data from the internet-enabled devices.

Other examples include satellite or aerial imagery that can be used to assess roof condition, presence of a pool or a trampoline, yard condition, and other property condition or quality of property. These conditions can be used in determining property information and factored into the rate calculation. For example, the presence of a trampoline may be used to factor or increase a rate for the property.

The property information module 306 accesses and retrieves property information from the pre-fill template 230 and applies the property information to the normalized tables from the rate normalization module 304 to compute a quote for each plan source 130.

In another example, the rate calculation module 308 computes a quote based on the combination of the extracted rate plans from rate plan extraction module 302 and personal information provided by a user submitting the query. The personal information may include, but is not limited to, an insurance score (generated by various insurance provider) of the user, and a credit score of the user. The rate calculation module 308 identifies whether the property information and/or the user information is included in a blacklist of names and addresses. The rate calculation module 308 retrieves a blacklist rate plan corresponding to the blacklist and computes the quote based on the blacklist rate plan. In other examples, the rate calculation module 308 computes the quote based on a combination of the blacklist rate plan and other conventional rate plans.

Figure 4:
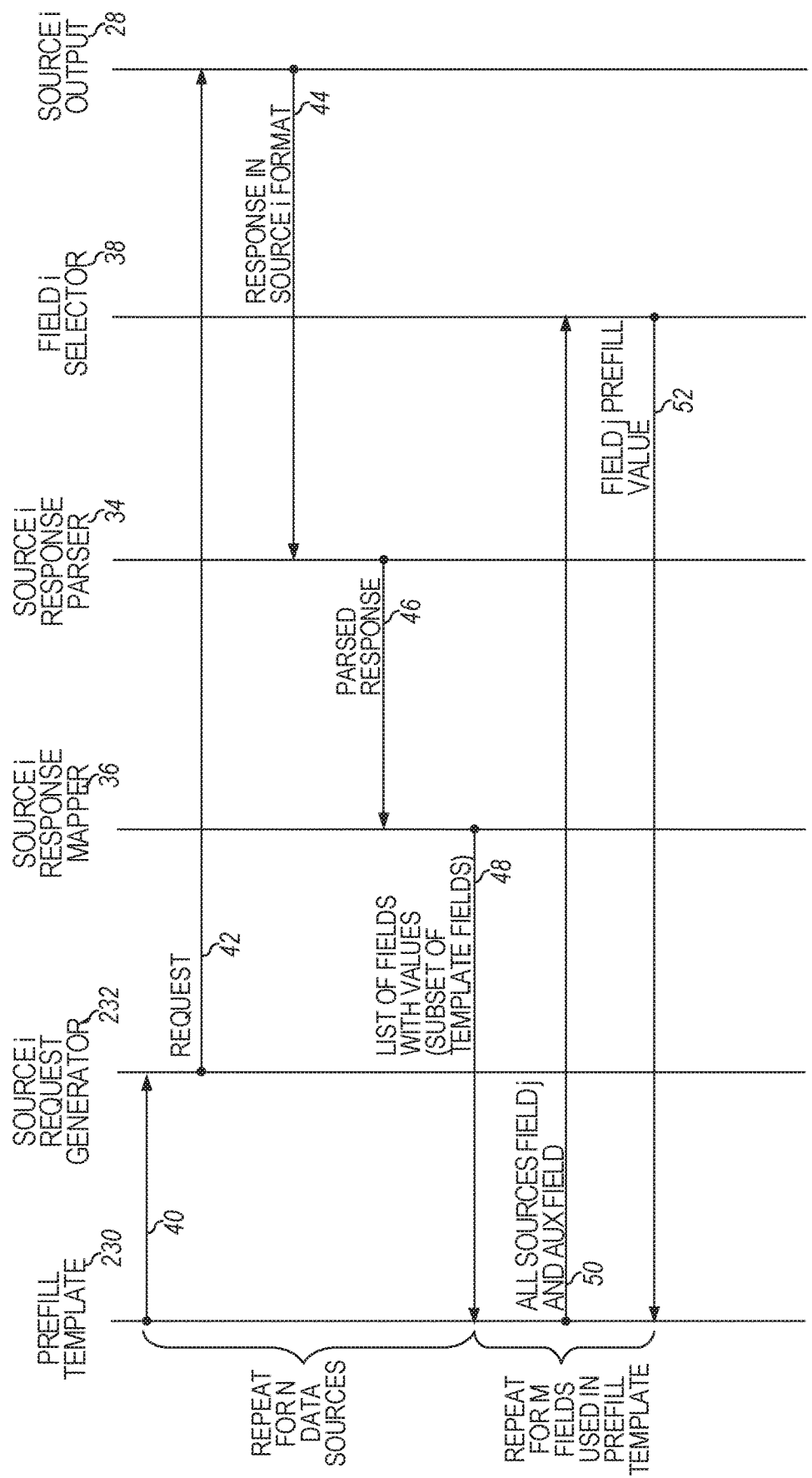
FIG. 4 illustrates a timing diagram showing the operation of the respective software components of the quote server, in an example embodiment.

FIG. 4 illustrates a timing diagram showing the operation of the respective software components of the quote server 120, in an example embodiment. As illustrated, upon the user initiating the customer survey process (e.g., by selecting a type of home in FIG. 11B), the pre-fill template 230 is initiated which, in turn, initiates the corresponding request generator(s) 232 at 40 to request information from the corresponding information source(s) 128 by sending requests i=1 through N (42) to the respective information sources 128 1 through N (28) as appropriate to complete the pre-fill template 230. The request generators 232 are built to comply with the documentation of the respective information sources 128 and send the requests in the format (e.g., Extensible Markup Language (XML)) expected by each information source 128. The request generators 232 thus save the user from having to initiate communications with each of the respective information sources 128. Each respective information source 128 responds to the request by providing a report in its native data format at 44. The respective responses 46 from each information source 128 are provided to the corresponding response parser which is also built to comply with the documentation of the respective information source 128, and the received data is normalized into a common format for loading into the pre-fill template 230 as described, for example, with respect to FIGS. 6 and 7. The response parser 34 thus interprets and sorts the received information without requiring user input. The parsed (normalized) responses 46 are provided to the corresponding response mapper 36 for mapping data received from the respective information sources 128 to respective data fields of the pre-fill template 230 as described below with respect to FIG. 5. This automation of the mapping function greatly accelerates the response process without requiring further user input. The mapped data is then provided as a list of data fields with information values from the information sources 128 at 48 for inclusion in the respective data fields of the pre-fill template 230.

It will be appreciated that certain data fields may receive data from multiple information sources 128, which may lead to data conflict if the received data has inconsistent values. Indeed, this feature enables the disclosed system to sample multiple information sources 128 for increased accuracy and to select the best information available. Thus, the field selector 238 compares the received data to identify such data conflicts where the data values are inconsistent. Upon detection of inconsistent data values for respective data fields, field selector 238 resolves the data conflicts based on predetermined business rules as described by way of example with respect to FIG. 8. The selection logic based on the business rules is manually developed by humans based on research, logic, limitations, anecdotal evidence, etc. to identify the best and most trustworthy data available. The data value for the selected information source 128 is provided to the pre-fill template 230 to update the data value for the corresponding data field in the pre-fill template 230.

As further illustrated in FIG. 4, the pre-fill template 230 may also ask the field selector 238 at 50 to forward auxiliary images for storage in the pre-fill template 230 as backup information for the information provided in the pre-fill template 230. The backup information is provided to the pre-fill template 230 at 52, if available. For example, satellite image data may be stored in the pre-fill template 230 with the selected data values from the selected information source 128 but the satellite image data is not necessarily made available to the potential customer via the GUI with the other pre-fill data in the pre-fill template 230.

Figure 5:
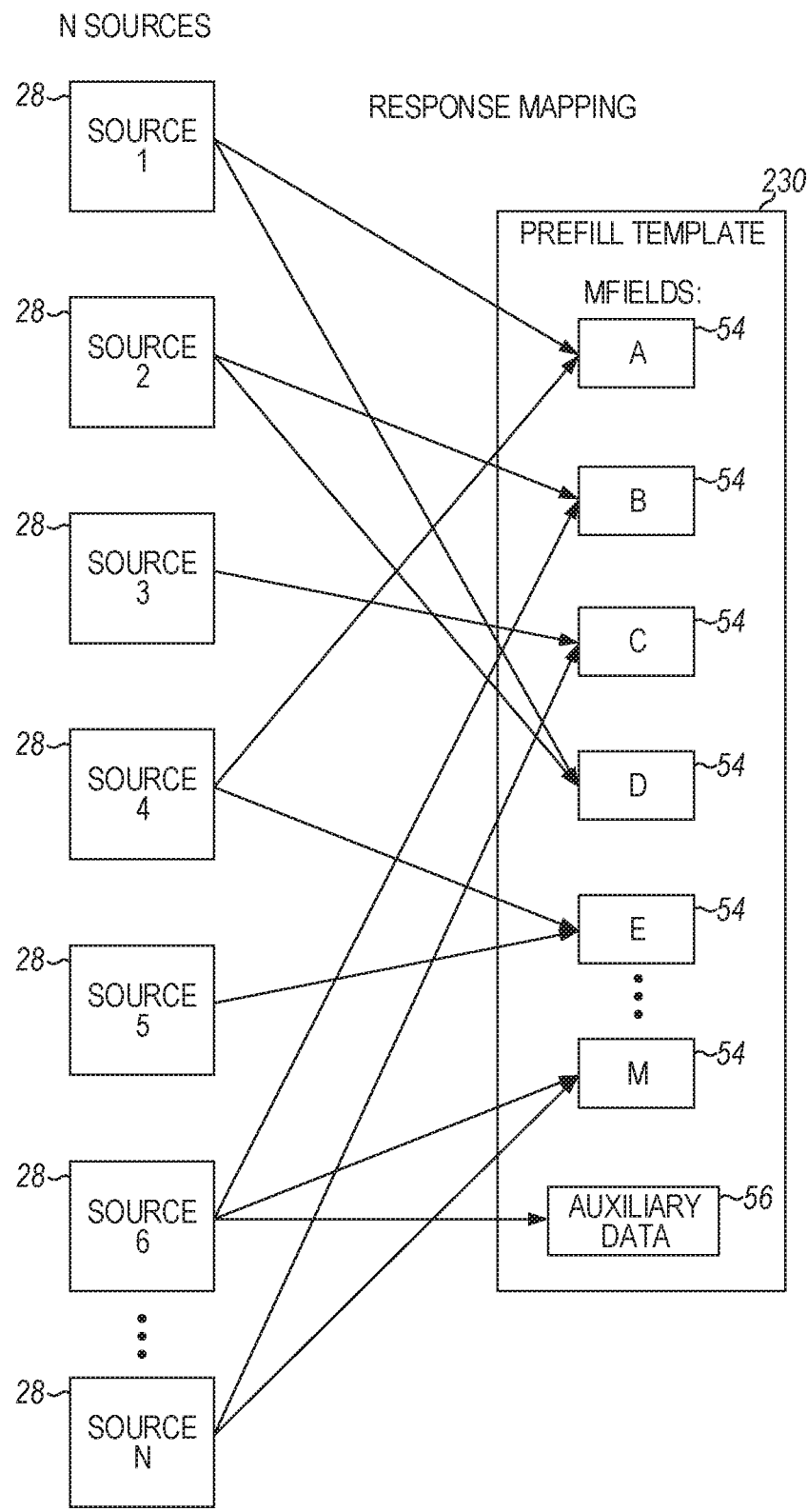
FIG. 5 illustrates the mapping of responses to the pre-fill template, in an example embodiment.

FIG. 5 illustrates the mapping by response mapper 36 of responses 46 from information sources 128 to the pre-fill template 230, in an example embodiment. As illustrated, the data from the respective information sources 128 may have relevance to one or more of the data fields 54 in the pre-fill template 230 and mapped to the data fields 54 in a one-to-one or one-to-many configuration. In example embodiments, the relevance of the data of a particular information source 128 to a particular data field 54 is determined in advance by the proprietor of the quote server 120 and mapped to the appropriate data field(s) 54. The mapping may be performed by assigning addresses, flags, or pointers to the data values from the respective information sources 128 or by other techniques well-known to those skilled in the art. Also, as appropriate, the data from the information sources 128 may be mapped to auxiliary data field 56 in support of the data values provided to the respective data fields 54 by that information source 128.

Figure 6:
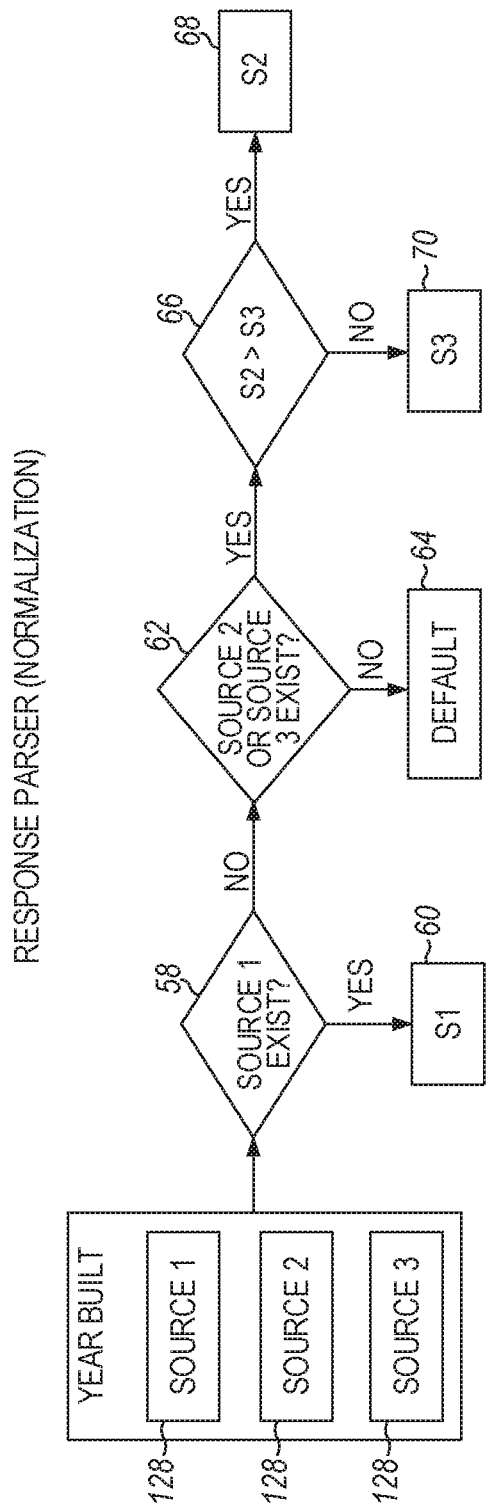
FIG. 6 illustrates an example of the operation of the response parser for identifying information to use to establish the year a home was built, in an example embodiment.

As noted above, the response parser 34 functions to normalize the data received from the respective information sources 128 into a common format for loading into the pre-fill template 230. FIG. 6 illustrates an example of the operation of the response parser 34 for identifying information to use to establish the year a home was built, in an example embodiment. In the example illustrated in FIG. 6, three different information sources 128 may have information relevant to the year that the identified home was built. The response parser 34 has established business rules that cross-reference the information sources 128 based on research and anecdotal evidence establishing which information source 128 is most accurate and thus the information source 128 to select in different circumstances. The business rules are manually created and applied to the respective information sources 128 dependent upon the types of information provided by the respective information sources 128. In this example, source 1 has priority over the other sources, so if data values are provided by source 1, it is determined at 58 that the data values from source 1 should be provided to the pre-fill template 230 at 60. However, if no data values are provided by source 1, it is determined at 62 whether any data values have been provided by source 2 or source 3. If no data values have been provided by source 2 or source 3, then a default value for the year built is provided at 64. For example, an average or median value for the relevant zip code may be obtained from an information source 128 and used in place of a particular value for that property. If data values have been provided by source 2 or source 3, then the data values are compared at 66 to determine which data values to use. In this example, if the data, values from source 2 are greater than source 3, then the data values for source 2 are provided to the pre-fill template 230 at 68. Otherwise, the data values for source 3 are provided to the pre-fill template 230 at 70. The response parser 34 may also use logic regarding how information from one or more information sources 128 is to be combined as well as logic identifying what information to use when the data values from the information sources 128 conflict. Generally speaking, this logic may be established in advance by studying the type of data provided by the respective sources 128 including its reliability, timeliness, format, and the like and making determinations as to when such information should be used when compared with other similar information sources 128. The determinations are then implemented as business rules such as: use source 1 when X is true; otherwise, use source 2, and the like.

The response parser 34 also normalizes the data formats of the data from the different information sources 128 for insertion into the pre-fill template 230 in an example embodiment. For example, data values from source 1 may be in XML format or a Portable Document Format (PDF) while the pre-fill template 230 is expecting data values in a JavaScript Object Notation (JSON) format. In such cases, the response parser 34 uses, for example, readily available open source conversion routines to remove the data responsive to the request and to convert the received data from, for example, XML data to JSON data and, as appropriate, to automatically convert the PDF data to JSON data in the same format as locally generated data.

Figure 7:
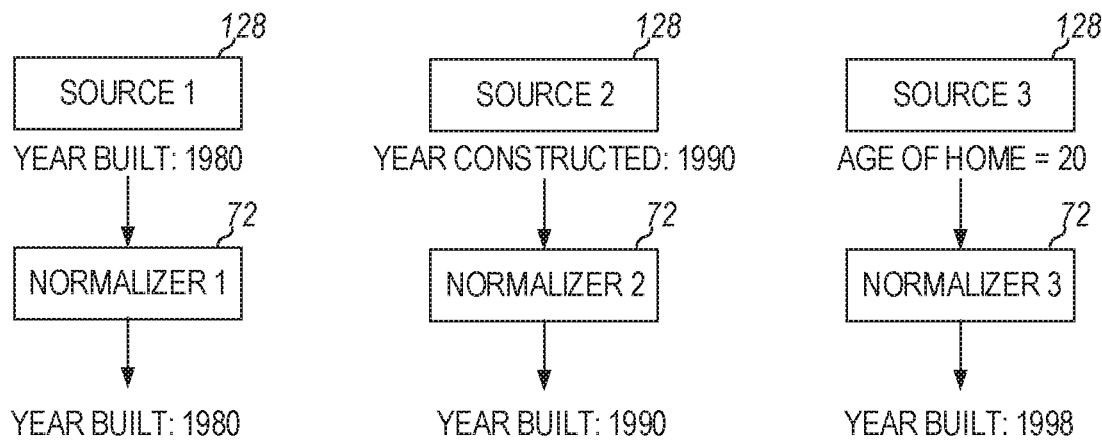
FIG. 7 illustrates an example of normalizing data from different information sources for insertion into the pre-fill template, in an example embodiment.

As illustrated in FIG. 7, the response parser 34 also normalizes the received data values into a common presentation format. For example, the year built data provided by the respective information sources 128 may be provided in different formats that need normalization. In the example of FIG. 7, the year built data from source 1 is in the format Year_built: 1980, while the year built data from source 2 is in the format YearConstructed: 1990, and the year built data from source 3 is in the format AgeofHome=20. Normalizers 72 are preprogrammed to parse the data and to change the data into a common format, in this example, Year_built: [data value] where [data value]=1980, 1990, and 1998 for the respective information sources 128. Since, in this case, the year built values are all different, it will be appreciated that the pre-fill template 230 will detect that the data values provided by the different information sources 128 are in conflict and that the conflict in the data values will need to be resolved by selecting one of the information sources 128, averaging the values, or performing some other function on the respective data values as appropriate.

Figure 8:
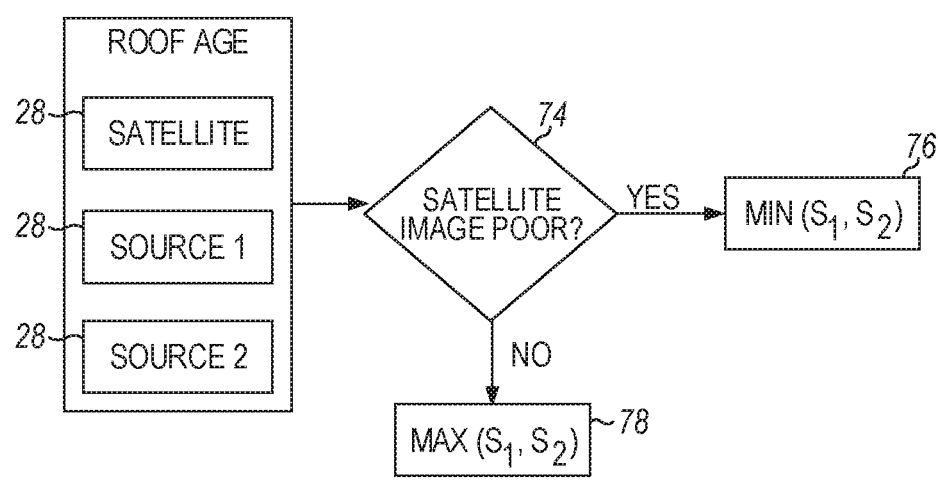
FIG. 8 illustrates an example of the operation of the field selector for selecting an information source to use, in an example embodiment.

FIG. 8 illustrates an example of the operation of the field selector 238 in selecting an information source 128 to resolve a data conflict in an example embodiment. The field selector 238 generally uses preloaded logic to resolve conflicts. In this example, the information sources 128 1 and 2 have provided inconsistent information relating to the age of the roof of the home. In this example, satellite image data is called upon to resolve the data conflict by providing evidence of the material of the roof within a confidence threshold that the information is accurate. Such information may be determined in advance based on the quality of the resource; in this example, the roof quality as determined by a satellite image, which is then incorporated into a business rule. If the satellite image indicates that the roof quality is poor (or no satellite image) for the particular home at 74, then the older roof age is assumed at 76. However, if the satellite image indicates that the roof quality is good for the particular home at 74, then the more recent roof age is assumed at 78. The selected roof age value is then provided to the pre-fill template 230 in the common format expected by pre-fill template 230. Of course, a simple average of the two roof age values could be taken, a default age could be assigned, or a value could be calculated from available inputs. Also, if the roof age values are significantly different, the roof age value could be flagged for check by the potential customer when the pre-fill template 230 is presented and could also be flagged for follow-up before an insurance or loan policy is issued. In example embodiments, the satellite image of the roof is stored in the auxiliary data field 56 of the pre-fill template 230 to corroborate the age of the roof. In other embodiments, the roof image may be analyzed using imaging software to calculate an age of the roof.

Figure 9:
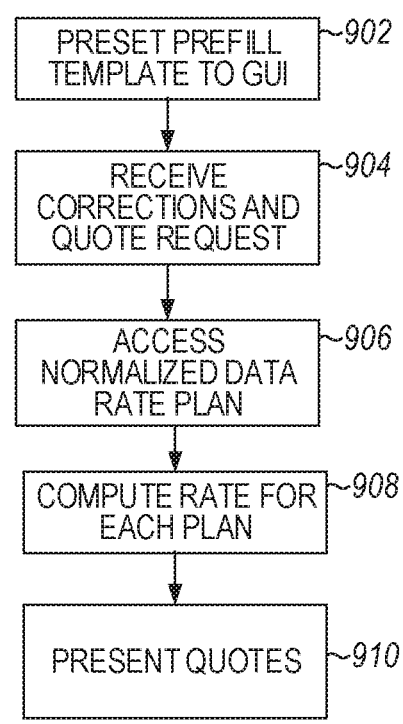
FIG. 9 is a flow diagram illustrating example operation of the quote server, in an example embodiment.

FIG. 9 is a flow diagram illustrating example operation of the quote server 120 in an example embodiment. As illustrated, the quote server 120 receives the address of the property in the case of a home to start the pre-fill process. Of course, if the property is an automobile, then a vehicle identification number may be provided instead. Similarly, if the property is some other form of personal property, then a product identification for the other form of personal property would be provided. The pre-fill template 230 then causes request generator 232 to issue a request for data from information sources 128 available to the proprietor of the quote server 120. The requested data from the information sources 128 is obtained in a few seconds and provided to the quote server 120 in the format of the information source 128 from which the information is provided. The response parser 231 then normalizes the data into a common format for storage in the pre-fill template 230 as described above. At operation 902, the normalized data is mapped to the pre-fill template data fields 54 by response mapper 236 as described above with respect to FIG. 5.

If the pre-fill template 230 receives data values in a particular data field 54 from more than one information source 128 and the data values differ, then the data conflict is resolved at 904. As noted above with respect to FIG. 8, this task is performed by field selector 238 by implementing pre-established business rules that enable the system to automatically select data values from one information source 128 over another. As noted above, this process enables multiple information sources 128 to be used and may be as simple as prioritizing one information source 128 over another or may be a function of the data values or conditionally based on other considerations as in the example of FIG. 8. Once the data conflict has been resolved, the data values from the selected information source 128 are provided to the pre-fill template 230 to update the data values in the corresponding data field 54. The updated pre-fill template 230 is then provided to the potential customer via the GUI generated by GUI generator 126. In example embodiments, the time from initiating the pre-fill operation to receiving the pre-filled customer survey is a few (e.g., five) seconds. The quote server 120 then waits for a response from the potential customer. The potential customer may provide corrections to the pre-filled data in the pre-fill template 230, approve the data, and/or may request a quote based on the presented data.

At operation 906, the quote server 120 then accesses the insurance or loan data, tables from plan sources 130 to normalize the data tables. At operation 908, the quote server 120 performs coverage calculations based on the normalized data tables and the pre-filled data in the pre-fill template 230 (or the approved data) At operation 910, the quote server 120 generates and presents a quote based on the customer corrected information provided in the pre-fill template 230 and the normalized data tables. The resulting process enables the quote server 120 to make real-time decisions about which information sources 128 to use in different situations and to enable the potential customer to obtain an accurate quote from multiple plan sources 130 in a very short period of time with an improved customer experience.

In this manner, the disclosed systems and methods reduce human error, improve data consistency, and increase speed as the need for human lookup of information in completing a customer survey is significantly reduced. The applicant need not look up the information but merely validate the accuracy of the information in the pre-filled forms that is inserted from the online information sources 128. As customer surveys are common components of insurance applications, loan applications, applications for club memberships, and other online applications, the systems and methods described herein provide solutions rooted in computer technology to provide benefits unique to computer networks 118 to enhance the user's experiences in the online environment.

Figure 10:
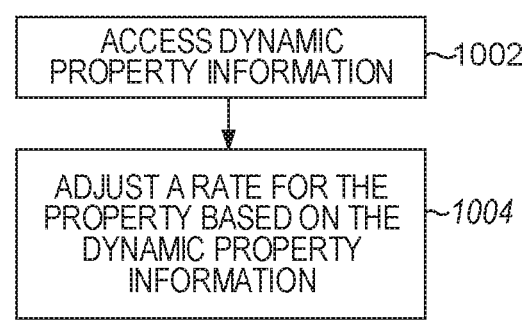
FIG. 10 is a flow diagram illustrating example operation of the rate computation engine of FIG. 3, in an example embodiment.

FIG. 10 is a flow diagram illustrating example operation of the quote server, in an example embodiment. At operation 1002, the rate computation engine 240 accesses data from dynamic information source 250. The dynamic information source 250 includes periodically updated data related to the property. The frequency of the update may vary from seconds to days. For example, temperature data or motion sensor data from network-enabled sensors located at the property may be updated every few seconds. At operation 1004, the rate computation engine 240 computes a rate or adjusts a previously computed rate based on the data from the dynamic information source 250.

Figure 11A:
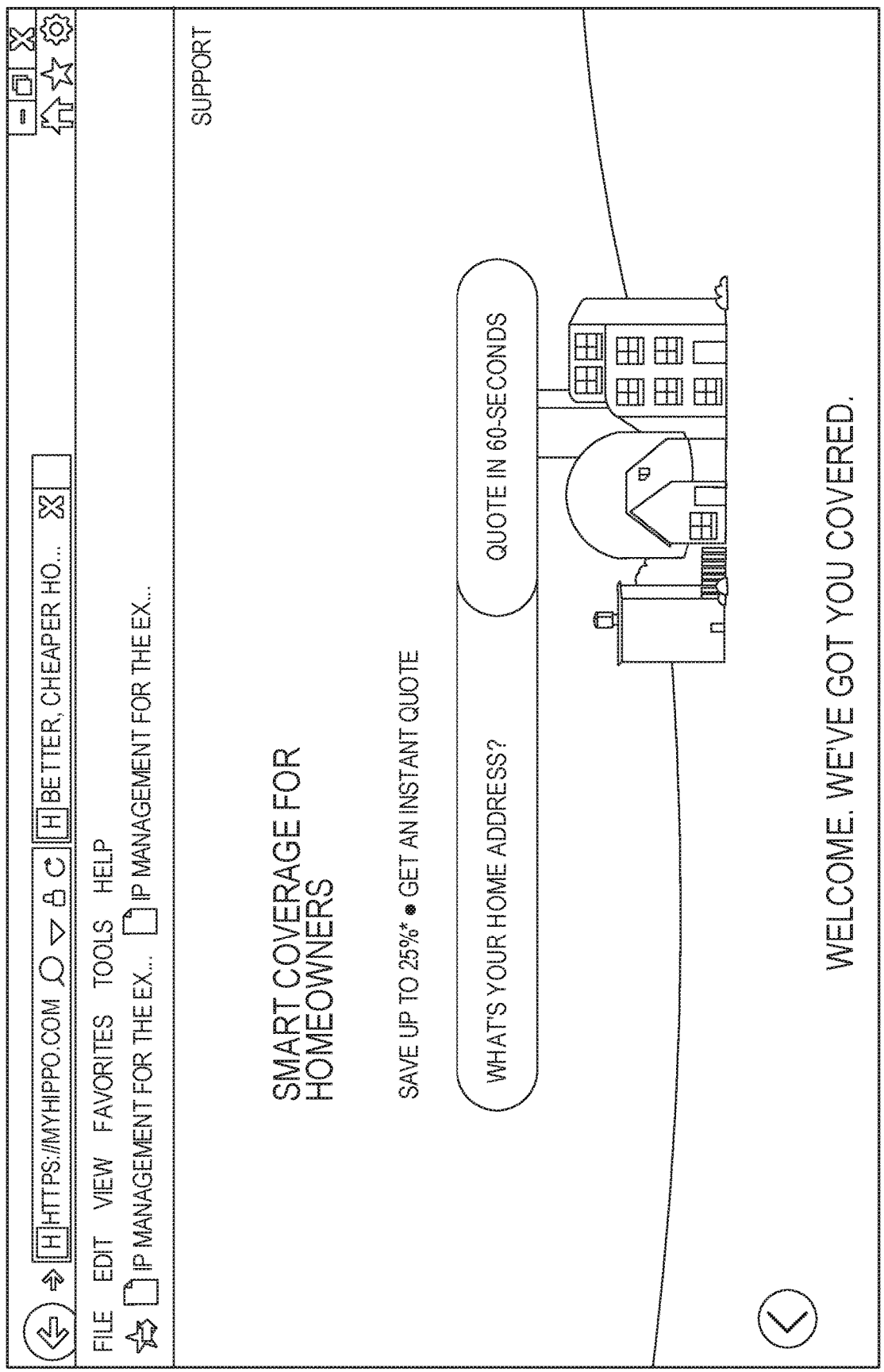
FIG. 11A illustrates a graphical user interface for initiating the process of generating a pre-filled customer survey for use in obtaining an insurance quote on a home, in an example embodiment.
Figure 11B:
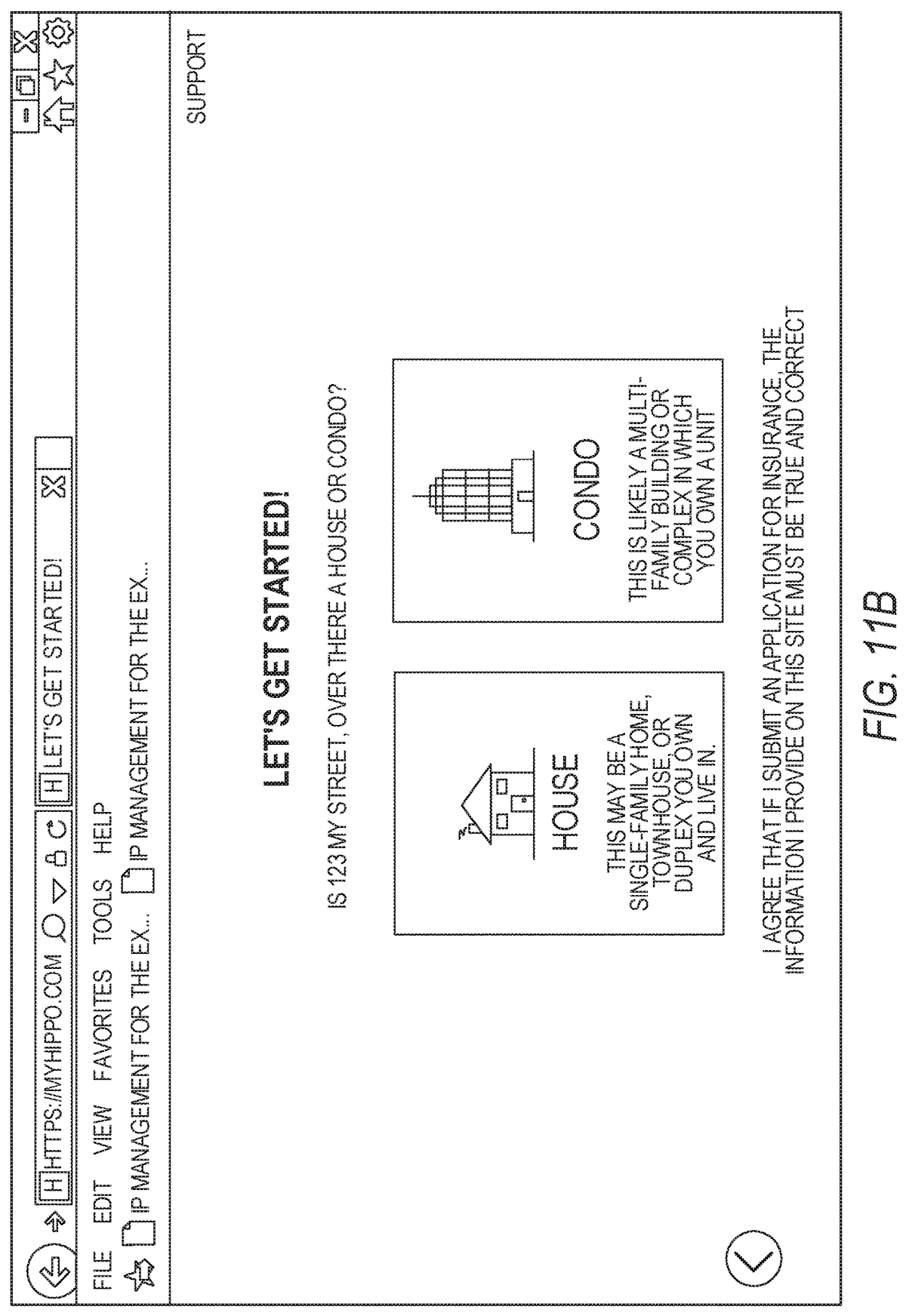
Figure 11C:
FIG. 11C illustrates a graphical user interface presenting pre-filled property information in response to the user's entry of only the address and type of home, in an example embodiment.

FIG. 11A illustrates graphical user interfaces in accordance with example embodiments for collecting information from a potential customer, generating a pre-filled survey, and providing a quote in minutes or even seconds from different plan providers. In the example of FIG. 11A, the pre-filled survey is used in the process of obtaining an insurance quote. It will be appreciated that the pre-filled customer survey may also be used for loan applications and other transactions for which information must first be gathered from the potential customer. As illustrated in FIG. 11A, a potential customer for home insurance is asked to provide information related to that customer and property for use in accessing publicly available information sources 128 and data vendors for information to pre fill the customer survey. In this example, the potential customer provides the address of the home to be insured. Once the address has been provided, the customer is asked to select the type of home, as illustrated in the graphical user interface illustrated in FIG. 11B. The address is stored so that it is unnecessary to prefetch the address data. Using the processes described in more detail below, this information is used to acquire property information about the home for presentation in a pre-fill template 230 as illustrated in FIG. 11C. In this example, the pre-fill template 230 includes property information about the home such as year built, square footage, roof type, year roof constructed/replaced, family units, stories, whether there is a swimming pool, and construction type of home. Of course, these are only examples; other types of property information may be gathered and presented as desired.

Once the basic property information has been obtained and pre-filled into the template, the potential customer is typically given the opportunity to change incorrect information, as appropriate. The potential customer is then asked to provide information about the fixtures and finishes in the home that is to be covered by the home insurance. To maintain the ease and speed of the process, the potential customer is typically asked to select a category for the fixtures and finishes as illustrated in FIG. 11D. Of course, the customer may be asked additional questions about the fixtures and finishes. Also, if such information is available from information sources 12/, the home address and customer information may be used to obtain additional pre-fill information about the fixtures and finishes as may be available from public information sources 128 and private data vendors.

Figure 11E:
FIG. 11E illustrates a graphical user interface for entering information identifying the potential customer.

Once the information about the home and the home's fixtures and finishes have been obtained, basic information about the potential customer is requested as illustrated in FIG. 11E. This customer information may be used, in turn, to obtain additional information about the customer and/or the home such as, for example, whether any insurance claims have been made against the home as well as the financial history, insurance claims, and/or credit status of the potential customer, provided the customer approves access to such information. The customer information and property information is then used along with insurance data tables to obtain the information required to generate an insurance quote for the home.

Figure 11G:
FIG. 11G illustrates a graphical user interface illustrating a quote selected from the options presented in FIG. 11F, in an example embodiment.

FIG. 11F illustrates a graphical user interface for presenting sample quotes to the potential customer based on the customer information and pre-filled property information so obtained. In an example embodiment, the potential customer is presented with policy options setting forth ranges of insurance features at different price points for selection. Upon selection of one of the options, a detailed quote is presented via the potential customer's graphical user interface as illustrated in FIG. 11G. The detailed quote may include an estimate of the cost to rebuild the home as well as other standard home insurance services.

In accordance with example embodiments, the entire process illustrated in FIG. 11A-F may be performed in a couple of minutes or less. It will be appreciated, by those skilled in the art, that the illustrated process has the benefit of reduced human error, improved data consistency, and increased speed as the need for human lookup of information is significantly reduced. The applicant need not look up the information but merely validate the accuracy of the information in the pre-filled forms that is inserted from the online information sources 128.

Modules, Components, and Logic

Certain embodiments are described herein as including software or logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors 122) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software executed by a general-purpose processor 122 or other programmable processor. Once configured by such software, hardware modules become specific machines (or specific components of a machine) uniquely tailored to perform the configured functions and are no longer general-purpose processors 122. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" or "hardware processor" as used herein should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed) each of the hardware modules need not be configured or instantiated at any one instance in time. For example, where a hardware module comprises a general-purpose processor 122 configured by software to become a special-purpose processor, the general-purpose processor 122 may be configured as respectively different special-purpose processors (e.g., comprising different hardware modules) at different times. Software accordingly configures a particular processor or processors 122, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 122 that are temporarily configured (e.g., by software) or permanently configured to perform the relevant operations. Whether temporarily or permanently configured, such processors 122 may constitute processor-implemented modules that operate to perform one or more operations or functions described herein. As used herein, "processor-implemented module" refers to a hardware module implemented using one or more processors 122.

Similarly, the methods described herein may be at least partially processor-implemented, with a particular processor or processors 122 being an example of hardware. For example, at least some of the operations of a method may be performed by one or more processors 122 or processor-implemented modules. Moreover, the one or more processors 122 may also operate to support performance of the relevant operations in a "cloud computing" environment or as a "software as a service" (SaaS). For example, at least some of the operations may be performed by a group of computers (as examples of machines including processors 122), with these operations being accessible via a network 118 (e.g., the Internet) and via one or more appropriate interfaces (e.g., an API).

The performance of certain of the operations may be distributed among the processors 122, not only residing within a single machine, but deployed across a number of machines. In some example embodiments, the processors 122 or processor-implemented modules may be located in a single geographic location (e.g., within a home environment, an office environment, or a server farm). In other example embodiments, the processors 122 or processor-implemented modules may be distributed across a number of geographic locations.

Machine and Software Architecture

The modules, methods, applications and so forth described in conjunction with FIGS. 1-10 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone 114, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Example Machine Architecture and Machine-Readable Medium

Figure 12:
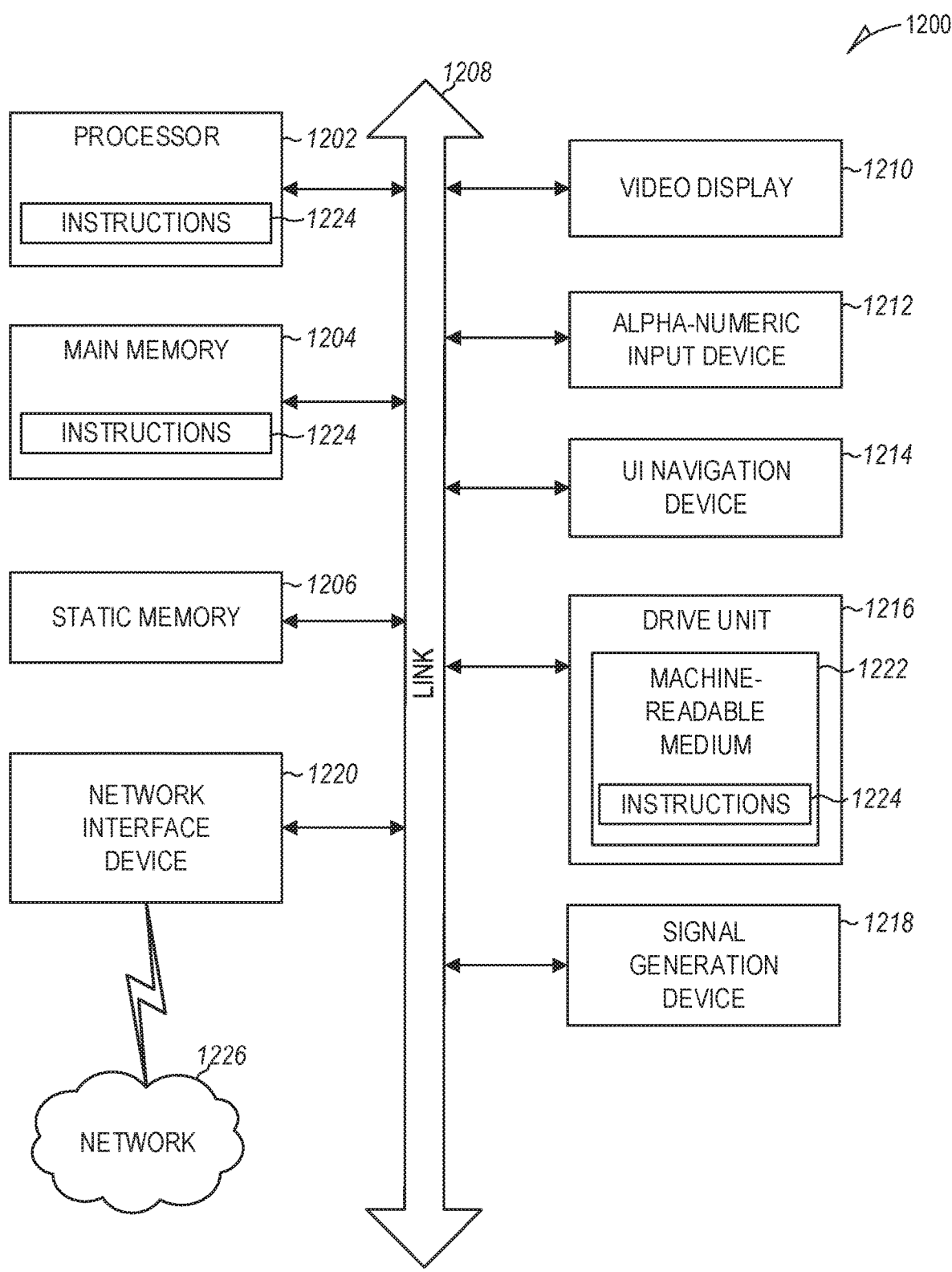
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. In this example, machine 1200 may correspond to quote server 120, processor 1202 may correspond to processor 122, and instructions 1224 may correspond to instruction memory 124. In this example, the communications platform 100 may include more than one processor 1202 (not shown) to execute or implement one or more of the application(s)/platform(s) described herein. The one or more processors 1202 may be any type of commercially available processor, such as processors available from the Intel Corporation, Advanced Micro Devices, Texas Instruments, or other such processors. Further still, the one or more processors 1202 may include one or more special-purpose processors, such as a field-programmable gate array (FPGA) or an application specific integrated circuit (ASIC). The one or more processors 1202 may also include programmable logic or circuitry that is temporarily configured by software to perform certain operations. Thus, once configured by such software, the one or more processors 1202 become specific machines 1200 (or specific components of a machine 1200) uniquely tailored to perform the configured functions and are no longer general-purpose processors 1202.

The communications platform 100 may further include various storage device(s) and/or machine-readable medium(s) for storing the application(s)/platform(s) and/or the data from the user, the respective plan sources 130, and the respective information sources 128. The machine-readable medium includes one or more devices configured to store instructions and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store the application(s)/platform(s) and the data from the user, the respective plan sources 130, and/or the respective information sources 128. Accordingly, the machine-readable medium may be implemented as a single storage apparatus or device, or, alternatively and/or additionally, as "cloud-based" storage systems or storage networks that include multiple storage apparatus or devices.

In one embodiment, the application(s)/platform(s) are written in a computer-programming and/or scripting language. Examples of such languages include, but are not limited to, C, C++, C#, Java, JavaScript, Perl, Python, or any other computer programming and/or scripting language now known or later developed. Also, the GUI generator 126 is configured to present one or more GUIs to the client device 112, 114, 116 for interacting with the communications platform 100.

Specifically, FIG. 12 shows a diagrammatic representation of the machine 1200 in the example form of a computer system, within which instructions 1224 (e.g., software, a program, an application, an applet, an app, or other executable code) for causing the machine 1200 to perform any one or more of the methodologies discussed herein may be executed. For example, the instructions 1224 may cause the machine 1200 to execute the flow diagram of FIG. 9. Additionally, or alternatively, the instructions 1224 may implement one or more of the components of FIG. 3 and FIGS. 5-8. The instructions 1224 transform the general, non-programmed machine 1200 into a special purpose machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a PDA, or any machine capable of executing the instructions 1224, sequentially or otherwise, that specify actions to be taken by machine 1200. Further, while only a single machine 1200 is illustrated, the term "machine" shall also be taken to include a collection of machines 1200 that individually or jointly execute the instructions 1224 to perform any one or more of the methodologies discussed herein.

The machine 1200 may include processors 1202, main memory/storage 1204, 1206, and I/O components 1220, which may be configured to communicate with each other such via a bus 1208. In an example embodiment, the processors 1202 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor 1202, or any suitable combination thereof) may execute the instructions 1224. The term "processor" is intended to include a multi-core processor 1202 that may comprise two or more independent processors 1202 (sometimes referred to as "cores") that may execute instructions 1224 contemporaneously. The machine 1200 also may include a single processor 1202 with a single core, a single processor 1202 with multiple cores (e.g., a multi-core processor), multiple processors 1202 with a single core, multiple processors 1202 with multiples cores, or any combination thereof.

The memory/storage 1204, 1206 may include a memory such as a main memory 1204, or other memory storage, and a static memory 1206, both accessible to the processors 1202 via the bus 1208. The main memory 1204 stores the instructions 1224 embodying any one or more of the methodologies or functions described herein. The instructions 1224 may also reside, completely or partially, within the memory 1206, within the drive unit 1216, within at least one of the processors 1202 (e.g., within the processor 1202's cache memory), or any suitable combination thereof, during execution thereof by the machine 1200. Accordingly, the memory 1206, the drive unit 1216, and the memory of processors 1202 are examples of machine-readable media 1222.

As used herein, "machine-readable medium" means a device able to store instructions 1224 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 1224. The term "machine-readable medium" shall also be taken to include any medium, or combination of multiple media, that is capable of storing instructions (e.g., instructions 1224) for execution by a machine (e.g., machine 1200), such that the instructions 1224, when executed by one or more processors of the machine 1200 (e.g., processors 1202), cause the machine 1200 to perform any one or more of the methodologies described herein. Accordingly, a "machine-readable medium" refers to a single storage apparatus or device 1222, as well as "cloud-based" storage systems or storage networks that include multiple storage apparatus or devices. The term "machine-readable medium" excludes signals per se.

The input/output (I/O) components (video display 1210, alpha-numeric input device 1212) may include a wide variety of components to receive input, provide output, produce output, transmit information, exchange information, capture measurements, and so on. The specific I/O components 1210, 1212 that are included in a particular machine 1200 will depend on the type of machine 1200. For example, portable machines such as mobile phones 114 will likely include a touch input device or other such input mechanisms, while a headless server machine will likely not include such a touch input device. It will be appreciated that the I/O components 1210, 1212 may include many other components that are not shown in FIG. 12. The I/O components 1210, 1212 are grouped according to functionality merely for simplifying the following discussion and the grouping is in no way limiting. In various example embodiments, the I/O components 1210, 1212 may include output components 1210 and input components 1212. The output components 1210 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1212 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1210, 1212 may include biometric components, motion components, environmental components, or position components among a wide array of other components. For example, the biometric components may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components may include acceleration sensor components (e.g., accelerometer), gravitation sensor components, rotation sensor components (e.g., gyroscope), and so forth. The environmental components may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218, 1220 may include communication components operable to couple the machine 1200 to a network 1226 (which may be network 118) or external devices via appropriate coupling (not shown). For example, the communication components 1218, 1220 may include a network interface device 1220 or other suitable device such a signal generation device 1218 to interface with the network 1226. In further examples, communication components 1218, 1220 may include wired communication components, wireless communication components, cellular communication components, near field communication (NFC) components, Bluetooth® components (e.g., Bluetooth® Low Energy), Wi-Fi® components, and other communication components to provide communication via other modalities. The external devices may be another machine 1200 or any of a wide variety of peripheral devices (e.g., a peripheral device coupled via a USB).

Moreover, the communication components 1218, 1220 may detect identifiers or include components operable to detect identifiers. For example, the communication components 1218, 1220 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF, Ultra Code, UCC RSS-2D bar code, and other optical codes), or acoustic detection components (e.g., microphones to identify tagged audio signals). In addition, a variety of information may be derived via the communication components 1218, 1220, such as location via Internet Protocol (IP) geo-location, location via Wi-Fi® signal triangulation, location via detecting a NFC beacon signal that may indicate a particular location, and so forth. UI navigation devices 1214 may also be provided as appropriate for the particular application.

Transmission Medium

In various example embodiments, one or more portions of the network 1226 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1226 or a portion of the network 1226 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (ENDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1224 may be transmitted or received over the network 1226 using a transmission medium via a network interface device (e.g., a network interface component included in the communication components 1218, 1220) and utilizing any one of a number of well-known transfer protocols (e.g., hypertext transfer protocol (HTTP)). Similarly, the instructions 1224 may be transmitted or received using a transmission medium via the coupling (e.g., a peer-to-peer coupling) to external devices. The term "transmission medium" shall be taken to include any intangible medium that is capable of storing, encoding, or carrying instructions 1224 for execution by the machine 1200, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated or by the particular elements identified. Structures and functionality presented as separate components in example configurations may be implemented as a combined structure or component. Similarly, structures and functionality presented as a single component may be implemented as separate components.

These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

NUMBERED EXAMPLES

Certain embodiments are described herein as numbered examples 1, 2, 3, etc. These numbered examples are provided as examples only and do not limit the subject technology.

Example 1 is system comprising a machine-readable medium 1222 storing computer-executable instructions 1224; and at least one hardware processor 1202 communicatively coupled to the machine-readable medium 1222 that, when the computer-executable instructions 1224 are executed, configures the server to perform operations comprising: accessing static property information of a property from a first plurality of sources; computing a rate for the property based on the static property information; accessing dynamic property information of the property from a second plurality of sources; adjusting the rate for the property based on the dynamic property information; and generating a rate graphical user interface that indicates the adjusted rate for the property.

Example 2 is a system as in Example 1, wherein the static property information is not updated for a predefined period of time, wherein the dynamic property information is updated over the predefined period of time.

Example 3 is a system as in Example 1, wherein the second plurality of sources comprises at least one of: network-based sensor devices located at the property, a weather forecast server, a satellite imagery server, and an aerial imagery server.

Example 4 is a system as in Example 1, wherein the network-based sensor devices indicate real-time occupancy information at the property.

Example 5 is a system as in Example 1, further comprising: assessing a current risk factor for the property based on sensor information from the network-based sensor devices, wherein adjusting the rate of the property is further based on current risk factor.

Example 6 is a system as in Example 1, further comprising: accessing rate plan tables from a plurality of plan sources; normalizing the rate plan tables to a rate computation format; accessing static and dynamic property information of the property; computing a rate for each plan source for the property information using a corresponding normalized rate plan computation table; and generating a plan comparison graphical user interface that indicates the rate for each plan source to a user computing device.

Example 7 is a system as in Example 6, wherein accessing the rate plan tables comprises: identifying a plurality of servers from the plurality of plan sources; querying each server for one or more rate plan tables corresponding to each plan source; and retrieving the rate plan tables from each server in response to the query.

Example 8 is a system as in Example 6, wherein the rate plan tables include a two-dimensional or three-dimensional matrix, and wherein the rate plan tables identify one or more property information variables, a coefficient, and an output.

Example 9 is a system as in Example 6, wherein normalizing the rate plan tables further comprise: identifying one or more rate plan tables that share the same property information; and associating the identified rate plan tables with each other.

Example 10 is a system as in Example 6, wherein accessing the property information further comprises: pre-filling the information needed for completing a customer survey relating to requested products and services by: receiving identifying information for the property; using property identifying information to request additional data about the property from at least one source of property information; receiving at least one response to the request for additional data about the property from the at least one source of property information; normalizing data received in the at least one response to a predetermined data format; mapping the normalized data to predetermined fields of a pre-fill template; and generating an entry graphical user interface including the updated pre-fill template for presentation to the user computing device as at least part of the customer survey.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The systems and methods described herein are captured within the scope of the following claims. It is understood by those skilled in the art that the claims encompass specific embodiments as well as embodiments that are not specifically described herein but which may include equivalent components and steps to those described herein as well as other features and modifications that would be apparent to those skilled in the art.

The invention claimed is:

1. A server comprising:
a machine-readable medium storing computer-executable instructions; and
at least one hardware processor communicatively coupled to the machine-readable medium that, when the computer-executable instructions are executed, configures the server to perform operations comprising:
accessing static property information of a property from a first plurality of sources;
receiving occupancy information from a user of the server;
computing a rate for the property based on the static property information;

accessing dynamic property information of the property from a second plurality of sources, wherein the second plurality of sources comprises a network-based sensor device located at the property, the network-based sensor device being connected to a security system located at the property, the security system being configured to receive sensor data from the network-based sensor;

accessing sensor data from the security system;

determining a pattern of activation and deactivation of the security system from the sensor data;

validating an accuracy of the occupancy information received from the user with the pattern of activation and deactivation of the security system;

adjusting the rate for the property based on the dynamic property information and the pattern of activation and deactivation, and the validated occupancy information; and generating a rate graphical user interface that indicates the adjusted rate for the property.

2. The server of claim 1, wherein the static property information is not updated for a predefined period of time, wherein the dynamic property information is updated over the predefined period of time.

3. The server of claim 1, wherein the second plurality of sources comprises at least one of: a weather forecast server, a satellite imagery server, and an aerial imagery server.

4. The server of claim 3, wherein the network-based sensor devices indicate real-time occupancy information at the property.

5. The server of claim 3, further comprising:
assessing a current risk factor for the property based on sensor information from the network-based sensor devices,
wherein adjusting the rate of the property is further based on current risk factor.

6. The server of claim 1, further comprising:
accessing rate plan tables from a plurality of plan sources;
normalizing the rate plan tables to a rate computation format;
accessing property information of the property, the property information comprising the static property information;
computing a rate for each plan source for the property information using a corresponding normalized rate plan computation table; and
generating a plan comparison graphical user interface that indicates the rate for each plan source to a user computing device.

7. The server of claim 6, wherein accessing the rate plan tables comprises:
identifying a plurality of servers from the plurality of plan sources;
querying each server for one or more rate plan tables corresponding to each plan source; and
retrieving the rate plan tables from each server in response to the query.

8. The server of claim 6, wherein the rate plan tables include a two-dimensional or three-dimensional matrix, and wherein the rate plan tables identify one or more property information variables, a coefficient, and an output.

9. The server of claim 6, wherein normalizing the rate plan tables further comprise:
identifying one or more rate plan tables that share the same property information; and
associating the identified rate plan tables with each other.

10. The server of claim 6, wherein accessing the property information further comprises:

pre-filling the information needed for completing a customer survey relating to requested products and services by:
receiving identifying information for the property;
using property identifying information to request additional data about the property from at least one source of property information;
receiving at least one response to the request for additional data about the property from the at least one source of property information;
normalizing data received in the at least one response to a predetermined data format;
mapping the normalized data to predetermined fields of a pre-fill template; and
generating an entry graphical user interface including the updated pre-fill template for presentation to the user computing device as at least part of the customer survey.

11. A computer-implemented method comprising:
accessing static property information of a property from a first plurality of sources;
receiving occupancy information from a user of the server;
computing a rate for the property based on the static property information;
accessing dynamic property information of the property from a second plurality of sources, wherein the second plurality of sources comprises a network-based sensor device located at the property, the network-based sensor device being connected to a security system located at the property, the security system being configured to receive sensor data from the network-based sensor;
accessing sensor data from the security system;
determining a pattern of activation and deactivation of the security system from the sensor data;
validating an accuracy of the occupancy information received from the user with the pattern of activation and deactivation of the security system;
adjusting the rate for the property based on the dynamic property information and the pattern of activation and deactivation, and the validated occupancy information; and
generating a rate graphical user interface that indicates the adjusted rate for the property.

12. The computer-implemented method of claim 11, wherein the static property information is not updated for a predefined period of time, wherein the dynamic property information is updated over the predefined period of time.

13. The computer-implemented method of claim 11, wherein the second plurality of sources comprises at least one of: a weather forecast server, a satellite imagery server, and an aerial imagery server.

14. The computer-implemented method of claim 13, wherein the network-based sensor devices indicate real-time occupancy information at the property.

15. The computer-implemented method of claim 13, further comprising:
assessing a current risk factor for the property based on sensor information from the network-based sensor devices,
wherein adjusting the rate of the property is further based on current risk factor.

16. The computer-implemented method of claim 11, further comprising:
accessing rate plan tables from a plurality of plan sources;
normalizing the rate plan tables to a rate computation format;

accessing property information of the property, the property information comprising the static property information;

computing a rate for each plan source for the property information using a corresponding normalized rate plan computation table; and generating a plan comparison graphical user interface that indicates the rate for each plan source to a user computing device.

17. The computer-implemented method of claim 16, wherein accessing the rate plan tables comprises:

identifying a plurality of servers from the plurality of plan sources;

querying each server for one or more rate plan tables corresponding to each plan source; and retrieving the rate plan tables from each server in response to the query.

18. The computer-implemented method of claim 16, wherein the rate plan tables include a two-dimensional or three-dimensional matrix, and wherein the rate plan tables identify one or more property information variables, a coefficient, and an output.

19. The computer-implemented method of claim 16, wherein normalizing the rate plan tables further comprise:

identifying one or more rate plan tables that share the same property information; and associating the identified rate plan tables with each other.

20. A machine-readable storage medium storing computer-executable instructions that, when executed by at least one processor, implement a method comprising:

accessing static property information of a property from a first plurality of sources;

receiving occupancy information from a user of the server;

computing a rate for the property based on the static property information;

accessing dynamic property information of the property from a second plurality of sources, wherein the second plurality of sources comprises a network-based sensor device located at the property, the network-based sensor device being connected to a security system located at the property, the security system being configured to receive sensor data from the network-based sensor;

accessing sensor data from the security system;

determining a pattern of activation and deactivation of the security system from the sensor data;

validating an accuracy of the occupancy information received from the user with the pattern of activation and deactivation of the security system;

adjusting the rate for the property based on the dynamic property information and the pattern of activation and deactivation, and the validated occupancy information; and generating a rate graphical user interface that indicates the adjusted rate for the property.

\* \* \* \* \*

UNITED STATES PATENT AND TRADEMARK OFFICE
CERTIFICATE OF CORRECTION

| | | |
|---|---|---|
| PATENT NO. | : 11,138,682 B2 | Page 1 of 1 |
| APPLICATION NO. | : 16/295919 | |
| DATED | : October 5, 2021 | |
| INVENTOR(S) | : Yelovitch et al. | |

It is certified that error appears in the above-identified patent and that said Letters Patent is hereby corrected as shown below:

On the Title Page

Item (71), in "Applicant", in Column 1, Line 1, delete "Analytics," and insert --Analytics Inc.,-- therefor Signed and Sealed this
Seventh Day of December, 2021

Drew Hirshfeld
*Performing the Functions and Duties of the
Under Secretary of Commerce for Intellectual Property and
Director of the United States Patent and Trademark Office*